United States Patent [19]

Fernandez

[11] Patent Number: 4,864,600
[45] Date of Patent: Sep. 5, 1989

[54] TELEPHONE CALL PROCESSING SYSTEM

[75] Inventor: Jorge D. Fernandez, Willowdale, Canada

[73] Assignee: Canamex Corporation, Ontario, Canada

[21] Appl. No.: 76,371

[22] Filed: Jul. 22, 1987

[30] Foreign Application Priority Data

May 28, 1987 [GB] United Kingdom ............... 8712584

[51] Int. Cl.$^4$ ........................................... H04M 11/00
[52] U.S. Cl. ......................................... 379/96; 379/93
[58] Field of Search ................... 379/93, 96, 164, 213,
379/214, 215, 262, 263, 157, 165, 218, 265;
340/365 R, 365 S; 341/22, 26

[56] References Cited

U.S. PATENT DOCUMENTS

| 4,382,163 | 5/1983 | White et al. | 379/164 |
|---|---|---|---|
| 4,436,962 | 3/1984 | Davis et al. | 379/214 |
| 4,476,349 | 10/1984 | Cottrell et al. | 379/214 |
| 4,506,111 | 3/1985 | Takenouchi et al. | 379/96 |
| 4,567,324 | 1/1986 | Smith et al. | 379/214 |
| 4,600,809 | 7/1986 | Tatsumi et al. | 379/96 |
| 4,682,354 | 7/1987 | Vanacore | 379/214 |

FOREIGN PATENT DOCUMENTS 8605650 9/1986 World Int. Prop. O. ............ 379/96

Primary Examiner—David K. Moore
Assistant Examiner—M. Fatahiyar
Attorney, Agent, or Firm—Sim & McBurney

[57] ABSTRACT

A telephone call processing system operates in tandem with an office telephone system having a central switchboard. The system comprises a central control unit used by the operator and remote units associated with each office telephone. The central unit comprises a keyboard and a display which permit the operator to compose and direct enquiry messages to each remote unit regarding handling of incoming calls and to compose and store records regarding unanswered calls. Each remote unit has a display which displays enquiry messages transmitted by the operator and flashes light emitting diodes or emits a muted beeping sound to draw an individual's attention to the incoming call. A number of buttons permit the individual to return standard responses without direct verbal communication with the operator. Both enquiry and response messages are automatically stored in an electronic memory, permitting the operator to retrieve each response and associated enquiry and to deal with the associated incoming call when appropriate. The operator can consequently process other incoming calls without awaiting a response from any particular individual. The remote units are adapted to access the electronic memory to retrieve messages regarding unanswered calls thereby eliminating the need for written message records.

25 Claims, 5 Drawing Sheets

TELEPHONE CALL PROCESSING SYSTEM

FIELD OF THE INVENTION

The invention relates generally to the handling of telephone communications within an office, and more particularly, to a telephone call message system which can be operated in tandem with an office telephone system to relieve demands placed on a switchboard operator and to permit faster and more reliable processing of telephone messages.

DESCRIPTION OF THE PRIOR ART

In most offices, it is common to have a central switchboard where incoming calls are initially received by an operator or receptionist. In response to any given call, the operator contacts and speaks to the individual for whom the incoming call is intended to determine whether the incoming call is to be passed for immediate response, whether the caller should be placed on hold, or whether a message should be taken so that the call can be returned at a later time. If the individual's line is busy, he is otherwise not available or does not wish to take the incoming call, the operator commonly prepares a written memo regarding the call, often on a standard form.

There are a number of very significant shortcomings in such conventional systems. Significant time demands are placed on the switchboard operator who must contact and await an individual's response before dealing with other incoming calls. Preparation of telephone messages, even using standard forms, consumes additional time. These matters become critical when the operator must simultaneously handle a large number of incoming calls. The various callers may be placed on hold for considerable lengths of time only to be advised that their calls will have to be returned at a later time and that a message must be taken. This situation and the errors in handling communications which result are either tolerated or an office may be provided with several switchboard operators, adding considerable expense in the operation of the office and in the provision of appropriate switchboard equipment.

Responding to operator enquires regarding incoming calls also causes considerable disruption of an individual's work schedule. This is a well-recognized factor in loss of office productivity. No discrete means are available to permit an individual to consider in a time-effective manner whether he should in fact receive a particular call and to respond in a time-effective manner.

Another significant shortcoming is lack of reliability in the delivery of telephone messages regarding unanswered calls. It is not uncommon for messages to be lost or delivered to office staff in a less than timely fashion.

It is an object of the present specification to provide a telephone call processing system which can alleviate the problems associated with conventional practices regarding the handling of office telephone communications.

BRIEF SUMMARY OF THE INVENTION

In one aspect, the invention provides a system for use in processing telephone calls received by a telephone switchboard operator and intended for individuals at a plurality of telephones to which the switchboard can direct incoming calls. The system comprises a central unit which can be used by the switchboard operator, and a plurality of remote units which can be used by the individuals and preferably located adjacent to their telephones. Means are provided to permit bidirectional transmission of messages between the central unit and each of the remote units.

The central unit has associated therewith display means for visually displaying messages and the like. Input means such as a keyboard permit the operator to compose a message regarding an incoming telephone call and to display the composed message. Means are provided to permit the operator to address and transmit the composed message selectively to any one of the remote units. Means are also provided for automatically storing response messages transmitted from the remote units to the central unit and to permit the operator to retrieve and display the stored response messages.

Each remote unit has associated therewith display means for displaying messages transmitted to the remote unit from the central unit. Response generating and transmitting means permit an individual at the remote unit to generate and transmit to the central unit a response message in response to a message transmitted from the central unit. These preferably comprise a number of buttons or other manually-operable switches which are programmed to produce predetermined responses instructing whether an incoming call should be passed to the intended recipient, placed on hold or not passed to the intended recipient in which case a record regarding the call may be taken so that the call may be returned at a later time.

The system preferably permits the operator to compose and store in appropriate storage means messages or records regarding unanswered calls together with information specifying or addressing the remote unit for which each such record is intended. Each remote unit may be provided with means for accessing the storage means to retrieve records addressed to the remote unit and to display such retrieved messages thereby eliminating the need to prepare and deliver memoranda regarding unanswered calls.

These and other inventive aspects of telephone call processing systems systems will be apparent from the description of a preferred embodiment below and will be more specifically defined in the appended claims.

DESCRIPTION OF THE DRAWINGS

The invention will be better understood with reference to drawings in which.

DESCRIPTION OF PREFERRED EMBODIMENT

Figure 3:
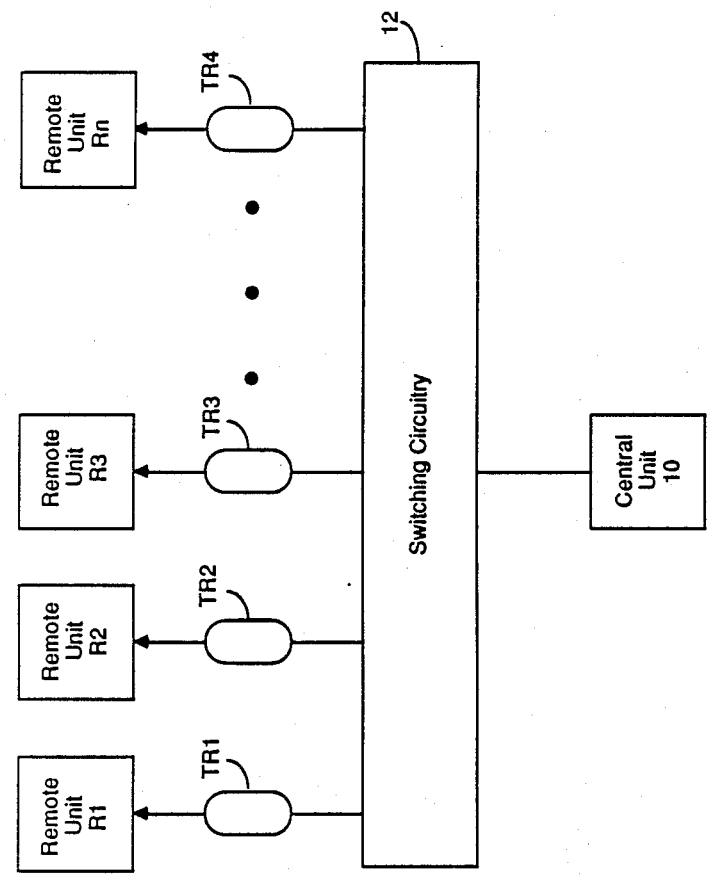
FIG. 3 schematically illustrates the overall configuration of the communications channels between the central and remote units.

Reference is made to FIG. 3 which schematically illustrates the overall configuration of a telephone call processing system according to the invention. The system comprises a central unit 10 intended for use by a switchboard operator and a multiplicity of remote units designated R1, R2, R3 up to Rn (designating an arbitrary number of such units although in practice the system would be adapted to handles some predetermined number of remote units). Each of the remote units would be associated with one office telephone. For purposes of addressing each remote unit individually and for permitting two-way communication between the central unit 10 and the remote units, there is provided switching circuitry 12 which receives address and information signals from the central unit 10 and selects an appropriate one of multiplicity of transceivers each connected to a different one of the remote units. The switching circuitry 12 also regulates the serial transmission of response data from each of the remote units via the transceivers designated TR1, TR2, TR3 up to TRn to the central unit 10.

Figure 1:
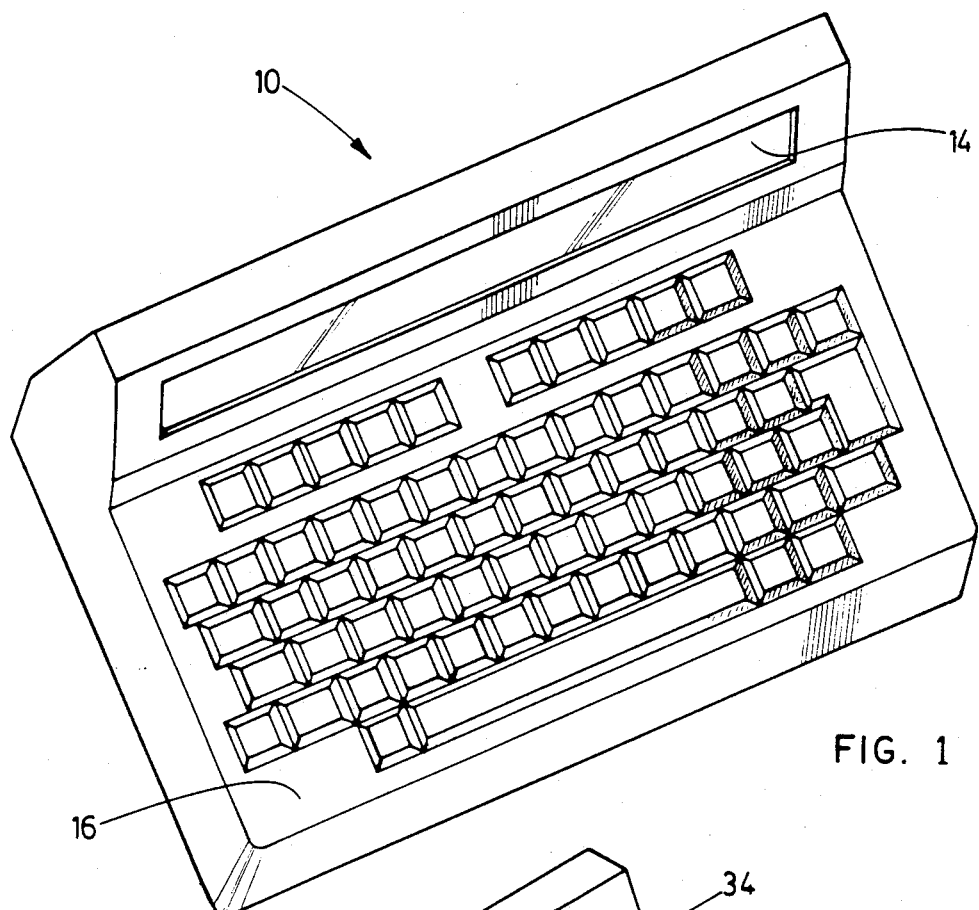
FIG. 1 is a perspective view of a central unit according to the invention.

The external configuration of the central unit 10 will be apparent in FIG. 1. The central unit 10 has a liquid crystal display (LCD) 14 which permits display of two lines of 40 characters each. This LCD 14 is used by the operator in part to compose and display enquiry messages to be transmitted to remote units to advise of incoming calls. The LCD 14 is also used to display the responses transmitted back to the central unit in response to the enquiry messages so that the operator can process the incoming calls accordingly. As well, the display may be used to compose records or messages regarding unanswered calls for storage and later retrieval at the remote units. All such messages or records are composed at a keyboard 16 which includes a number of function keys that permit the operator to select standard message segments such as "is on the line", "will call again", "please call back", "returned your call", "came to see you" and "phoned but no message". In most instances, the central operator need only type the caller's name and press the appropriate function key to compose either an initial message soliciting instructions regarding handling of an incoming call or to prepare a record regarding a call to be returned at a later time. For purposes of record preparation, it should be noted that information such as the date and time of receipt of a call is generated from information provided by an electronic clock and calendar unit 18 and automatically incorporated into a stored record thereby reducing the time required to prepare such records.

Figure 4:
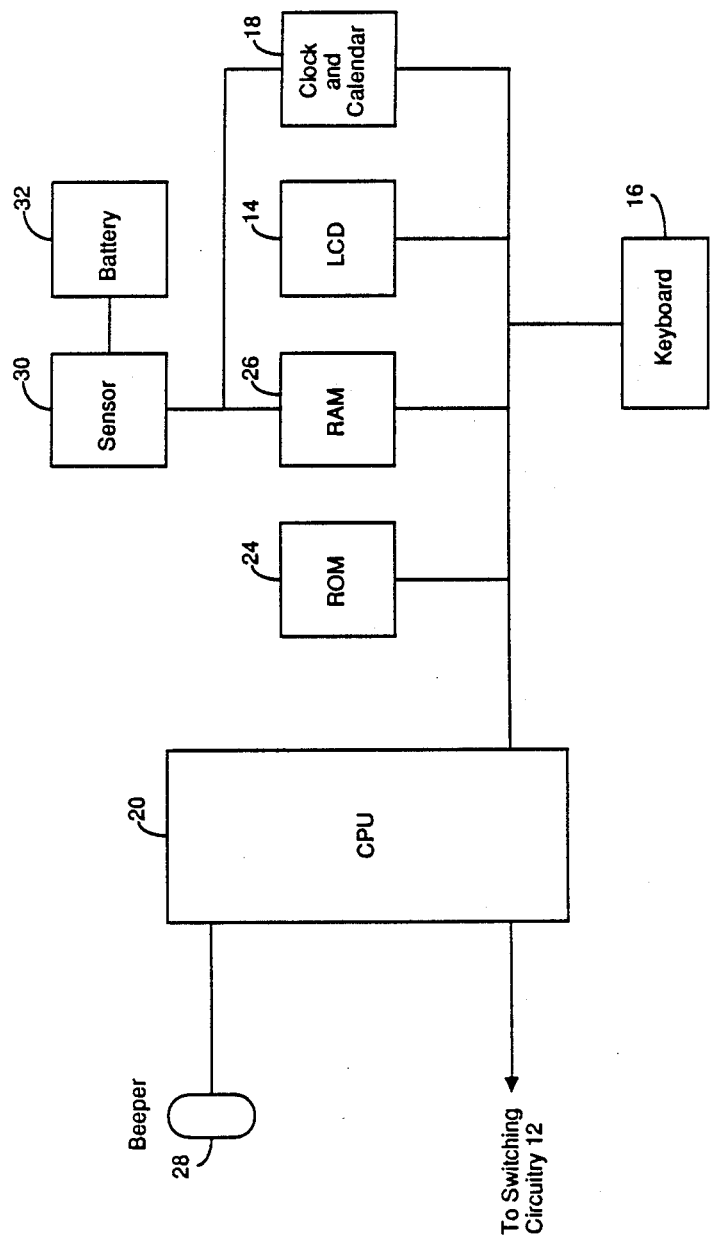
FIG. 4 is a schematic diagram illustrating various components of the central unit.

FIG. 4 is a schematic illustration of electronic circuitry associated with the central unit 10. That circuitry includes a central processing unit (CPU) 20, a conventional microprocessor chip, which communicates with various central unit components via an address and data bus 22. The other components include a read-only memory (ROM) unit 24 which stores the software algorithm used to implement the various functions association with the central control unit and described herein. As an alternative, it is possible to use a microprocessor chip which has an internal ROM unit. A random access memory (RAM) unit 26 serves as means for storing data such as remote unit identification codes and names of individual associated with the remote units, enquiry messages sent by the central unit 10 to the various remote units, responses received from the remote units and also records regarding unanswered calls. The keyboard 16, the LCD 14 and the clock and calendar unit 18 are similarly coupled in a conventional manner to the data and address bus associated with the CPU 20 for individual addressing of these components and for transfer of data. The CPU 20 is also coupled to circuitry which drives a beeper 28 and programmed to respond to each incoming response from a remote unit to provide an audible indication to the operator that a response has been received. It should be noted that the various components associated with the central unit 10 need not be located in a single housing.

The central control unit 10 is provided with means for ensuring that data stored in the RAM unit 26 is not lost in the event of disconnection of the central unit 10 from a line source or in the event of a power failure. A sensor 30 detects a failure of power from the line source and couples a battery to both the RAM unit 26 and the clock and calendar unit 18 to maintain any messages and other data stored in the RAM unit 26 and to maintain the currency of the clock and calendar unit 18.

Figure 2:
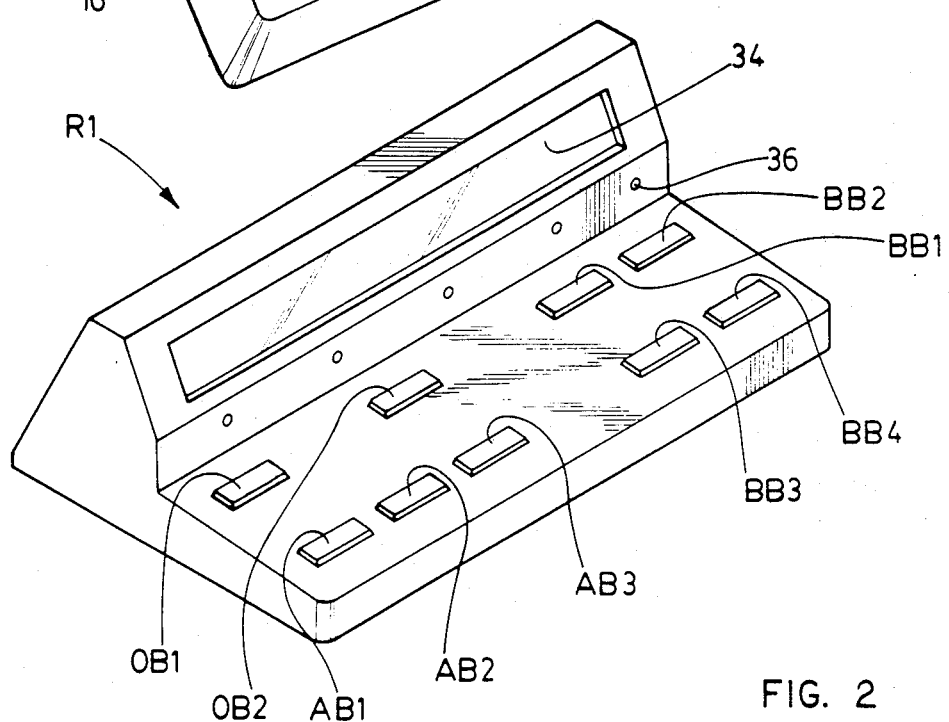
FIG. 2 is a perspective view of a remote unit.

The external configuration of a typical remote unit R1 is illustrated in FIG. 2. The remote unit R1 has an LCD 34 which permits display of two lines of 40 characters each. The LCD 34 serves to display enquiry messages transmitted by the central unit 10 regarding incoming calls and to display messages regarding unanswered calls retrieved from the RAM unit 26 of the central control unit. The remote unit R1 also has a number of light emitting diodes (LED's) (only one LED 36 being specifically indicated) which are flashed in response to incoming enquiry messages and also has a beeper which can optionally be used to audibly alert an individual that a response to an incoming call is required.

The remote unit R1 is provided with a number of function buttons which permit quick response to messages regarding incoming calls and which permit retrieval and processing of stored messages. These include three answer buttons AB1–AB3, which are preferably colour-coded green, yellow and red respectively, which cause transmission to the central unit 10 of the following standard messages: "pass the call", "hold the call", and "take a message", respectively. These answer buttons may alternatively be labeled with corresponding inscriptions such as "PASS", "WAIT" and "POSTPONE" and the colour-coding eliminated. Four other buttons BB1–BB4, coloured blue, are labeled with the inscriptions: "MESSAGES", "CLEAR", "NEXT" and "PREVIOUS", respectively. Actuation of these buttons triggers the remote unit R1 for the following operations, respectively: toggling between display of telephone messages and display of date and time information; deletion of the current displayed message from the RAM unit 26; "scrolling up" through the messages stored in the RAM unit 26; and "scrolling down" through the messages stored in the RAM unit 26. Optional buttons OB1 and OB2 may be provided to indicate to the operator requests for coffee or other refreshment or requests that the operator call the individual associated with the remote unit R1 directly.

Figure 5:
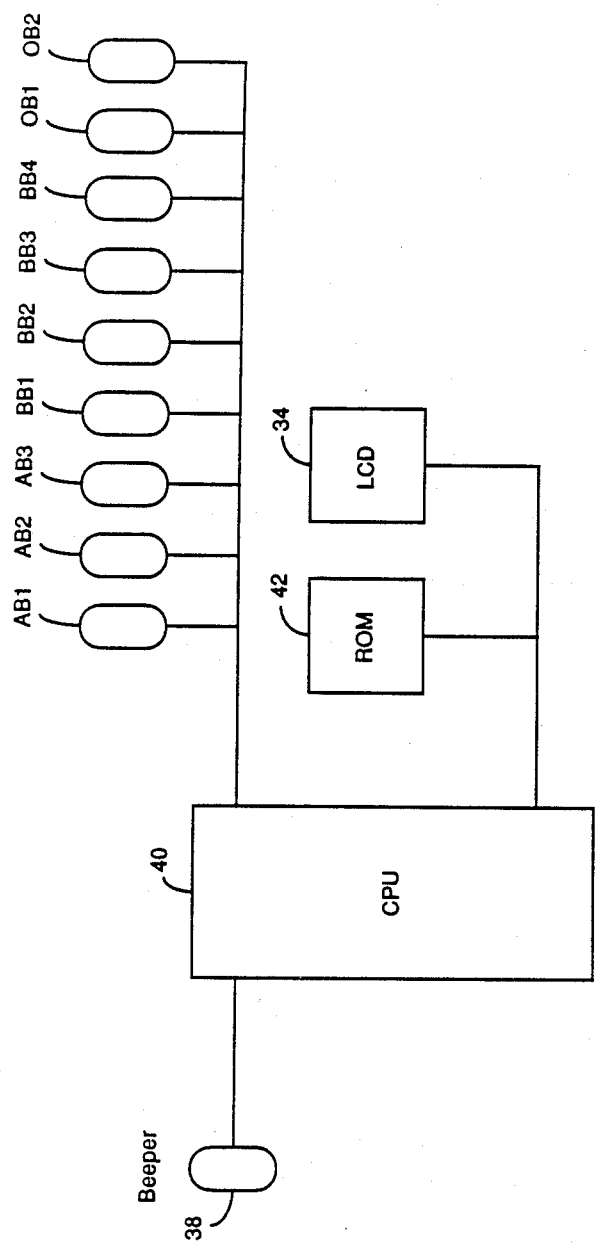
FIG. 5 is a schematic diagram illustrating various components of a remote unit.

FIG. 5 is a schematic representation of electronic circuitry associated with the remote unit R1. The remote unit R1 may be seen to comprise a CPU 40 which regulates the overall operation of the remote unit R1. The CPU 40 includes a RAM unit for temporary storage of incoming messages or the like. The remote unit R1 has a data and address bus by means of which the CPU 20 transfers data to the LCD 14 to display messages and retrieves instructions from an ROM 42 which stores the software algorithm that dictates the operation of the remote unit R1. The CPU 40 is programmed by the ROM 42 to respond to incoming messages by actuating the LED's through an appropriate driver circuit to attract an individual's attention and optionally actuating a driver circuit which causes a beeper to produce a muted sound and to perform other functions described more fully below. The CPU 40 also periodically polls the buttons to determine whether a button has been depressed. If a button has been depressed, the CPU 40 causes a predefined signal to be transmitted to the central unit 10 indicating the required response. Such signals may be stored in the ROM 42 for retrieval by the CPU 40.

The remote units are themselves programmed to retrieve from the RAM unit 26 associated with the central unit 10 date and time information and to display the information on the local display as well as retrieving any messages regarding unanswered calls. The central unit 10 constantly communicates with the remote units to update the relevant date and time information and consequently if no changes occur to the time information displayed at a remote unit it will be apparent to the individual at the particular remote unit that the unit is either not functioning properly or not communicating with the central unit 10.

Initial set-up of the message processing system is substantially as follows. The operator enters a command at the keyboard 16 which conditions the central unit 10 for initial configuration of the call processing system. The operator may then enter key commands which instruct the central unit 10 to set the date and time for use in recording messages to unanswered calls and otherwise made available to the remote units. The operator also enters data associating each remote unit in the system with a particular individual's name (the user of a telephone associated with the remote unit) and an identification code. For each individual, the operator can also enter data specifying whether the central unit 10 is to actuate the beeper driver associated with his remote unit with enquiry message transmitted to the remote unit, according to the individual's preference. This information is stored in the RAM unit 26 associated with the central unit 10 for retrieval when transmissions to the remote units must be made. Optionally, the central unit 10 may be programmed to request, as a first step in the configuration of the system, the language of preference for display of messages and prompts generated by the central unit 10 and thereafter to display such information in the selected language.

The operator at the central unit 10 responds to each incoming telephone call received at the switchboard essentially as follows. The operator enters the identification code associated with the individual to whom the call is directed or the name of the individual, the identification code or name being echoed on the LCD 14 associated with the central unit 10. The central unit 10 then retrieves from the RAM unit 26 a corresponding record and the selected individual or remote unit by displaying both his name and the corresponding unit identification code on the LCD 14. Otherwise the central unit 10 indicates on the LCD 14 that data entered does not identify any person or remote unit recorded in the system. If a proper individual or remote unit has been identified, the operator is then prompted on the LCD 14 to select either communications or record preparation modes of operation by typing the letter "C" for communications or "M" for message (indicating a record is to be prepared regarding an unanswered call).

The operator selects the communications mode at the keyboard 16 in order to send an enquiry message. The operator then composes the enquiry message at the keyboard 16 using the function keys to expedite the process. If the enquiry message is appropriate, the operator depresses the enter key of the switchboard 16, and the central unit causes the displayed enquiry message to be transmitted to the appropriate remote unit. If during initial configuration of the system the remote unit has required to beep in response to each enquiry message transmitted thereto, the central unit also transmits with the enquiry message a sound command signal. The central unit 10 automatically assigns an enquiry identification code and automatically records the transmitted enquiry message together with the enquiry identification code and the remote unit identification code in the RAM unit 10. The retrieval of such information for later use is described more fully below.

It will be assumed for purposes of describing the operation of the remote units that the transmitted enquiry message has been addressed to the remote unit R1. The transmitted enquiry message is temporarily stored in the RAM unit associated with the CPU 40, and the CPU 40 automatically causes the received enquiry message to be displayed on the associated LCD 34. The CPU 40 then causes the LED's associated with the remote unit R1 to flash. If a sound command signal has been transmitted together with the enquiry message, the CPU 40 causes the beeper 38 to emit a muted, low-level beeping sound. The individual can respond to the enquiry message by operating one of the buttons AB1–AB3 to cause generation and transmission of the appropriate response. If none of the buttons AB1–AB3 is operated within 10 seconds of receipt of the message, the CPU 40 causes a beeper 38 to emit a sound regardless of the initial optional selection for the remote unit R1. If none of the buttons AB1–AB3 is operated within a further 15 seconds, the CPU 40 automatically causes transmission of a default response message to the central unit 10 to the effect that "No one is in the office. Please take a message".

The CPU 40 automatically transmits with the response message (default or otherwise) the enquiry identification code associated with the received enquiry message. This serves as a response identification code, the purpose of which is described more fully below. The response returned by the remote unit R is echoed on the remote unit LCD 34 and remains on the LCD 34 until the clear button BB2 is depressed or until the response is displaced with a subsequent enquiry message.

The CPU 20 associated with the central unit 10 automatically causes the response message received from the remote unit and the associated response identification code to be stored in the RAM unit 26. The CPU 20 of the central unit 10 at the same time cause the generation of a beeping sound to indicate to the operator the return of a response. Upon receipt of the response, other than a default response, the CPU 20 of the central unit 10 causes transmission to the remote unit of an "OK" message indicating receipt of the response, and this message remains displayed on the LCD of the remote unit for 5 seconds, thereafter being replaced with the normal date and time display.

Since the responses from remote units are automatically recorded, the operator need not respond immediately to any individual's transmitted instructions. The operator can transmit enquiry message to other remote units indicating incoming calls or can process other incoming calls or considering responses received from other office staff regarding pending calls.

The recorded responses and associated enquiry messages stored in the RAM unit 26 are illustrated in FIG.

Figure 6:
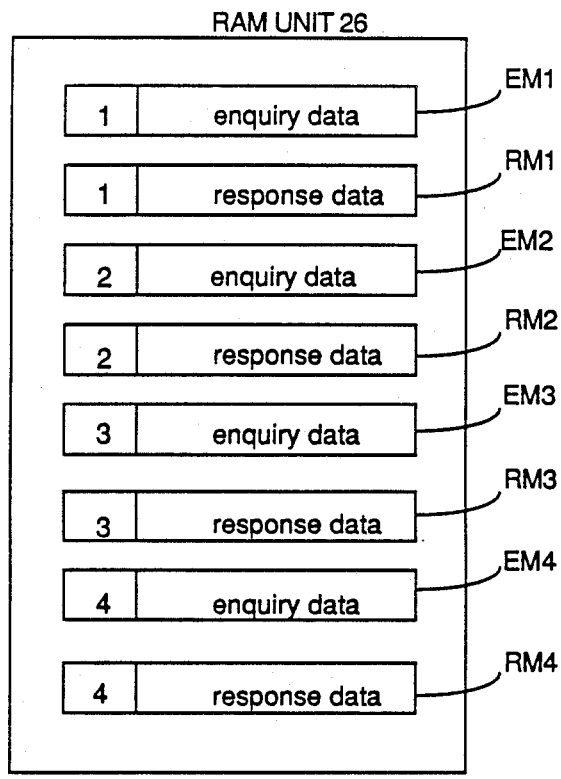
FIG. 6 diagrammatically illustrates how response and enquiry messages generated by the system are recorded for later retrieval and review.

6. It should be understood that FIG. 6 is a diagrammatic representation for the purposes of describing the operation of the system and does not depict the actual relative location of response and enquiry records nor their full format. In FIG. 6, four recorded enquiry message EM-1-EM4 have been illustrated which are associated respectively with four recorded response messages RM1-RM4. The response message RM1-RM4 would have been generated by individuals at the remote units or may be default messages generated by the remote units themselves. Each recorded enquiry message EM-1-EM4 has a field respectively designated EF1-EF4 which records the enquiry message identification code assigned to the enquiry message at the time of generation and transmission by the central unit 1. Similarly, each recorded enquiry message RM1-RM4 has a field respectively designated RF1-RF4 which records the response identification code assigned to the response message at the time of generation and transmission by one of the remote units. The CPU 20 may maintain the recorded response messages in a linked list maintained in chronological order according to the time of receipt by the central unit 10. A pointer to the chronologically earliest response will be maintained in the RAM unit 26 to permit retrieval of the response messages in chronological order. An alternative arrangement might involve relating the enquiry messages by a linked list reflecting their chronological order of generation by the central unit 10. The manner in which linked lists are created and manipulated will be readily apparent to skilled computer programmers.

For purposes of describing system operation, it will be assumed that the enquiry message whose generation has been described above in detail is EM3 and that the associated response message is R3. It will also be assumed that the enquiry message EM3 was generated by the central unit 10 earlier than the other enquiry messages and that the response message RM3 was received by the central unit 10 earlier than the other stored response messages (which need not be the case, for example, if R3 were a default response and in view of the delay inherent in generating a default response). It will be noted that the enquiry message field EF3 contains the enquiry identification code "3", assigned by the central unit 10 at the time of transmission of the message EM3 to the remote unit R1. The field RF3 of the associated response message RM3 contains a corresponding response identification code "3", assigned by the CPU 40 associated with the remote unit R1 at the time of generation and transmission of the response message RM3.

The operation of retrieving the response message RM3 and the associated enquiry message EM3 (if the operator requires the enquiry message) proceeds substantially as follows. The central unit 10 has an idle or rest mode of operation in which first line of the central unit LCD 24 prompts the operator for entry of the identification code of a remote unit or the name of an individual. If response messages are recorded in the RAM unit 26, the CPU 20 associated with the central unit 10 cause the second line of the LCD 24 to display the letters "R" and "A". By depressing a command key together with the letter "R" of the keyboard 16, the operator causes the CPU 20 to display the chronological earliest response, namely, the response R3 on the first line of the LCD 24 (displacing the prompt otherwise displayed). If the operator once again depressing the command key together with the letter "R", the CPU 20 is instructed to retrieve the associated enquiry message EM3 which the CPU 20 does by examining the fields of the recorded enquiry messages containing until it locates the enquiry identification code "3" corresponding to the response identification code "3" associated with the response R3. By depressing the command key and the key "R" repeatedly, the operator can alternately display the response message RM3 and the associated enquiry message EM3. Accordingly, the operator can retrieve not only the response R3 but also the original enquiry EM3 which would likely contain information regarding which line on the switchboard the response relates to and also the name of the caller. Once the operator has responded to the caller, the operator can depress the command key together with the letter "A" to acknowledge the response R1 or the associated enquiry message EM3 which are currently being displayed in a sequential or toggling fashion on the LCD 14 effectively to delete both the response R3 and the enquiry message EM3 from their respective linked lists and from RAM unit 26.

This particular response and enquiry retrieval arrangement has been designed so that the central unit requires only a low cost display such as the LCD 14. It is within the ambit of the present invention, for example, to provide a cathode ray tube display and permit display all recorded responses and associated enquiry messages, concurrently rather than sequentially. With such an alternative arrangement, it would be possible to permit the operator to select any particular stored response for immediate processing and to eliminate processing in any chronological order. In any retrieval arrangement appropriate for the present invention the key factor is that the operator be given a visual indication of the association of any recorded enquiry message and the corresponding response.

It should be noted that records regarding unanswered calls may be similarly stored in linked lists in the RAM unit 26. In such instances, rather than recording the enquiry or response identification code, the relevant field of such a record may contain the remote unit identification code to which the record is addressed.

Whenever telephone messages are awaiting the individual at a particular remote unit or the number of messages changes, the central unit 10 transmits to the remote unit a signal indicating the number of messages stored. This signal causes the remote unit affected to display not only the current date and time but also a message to the effect that a certain number of messages are stored. The individual at the remote unit R1, for example, can then depress the button BB1 to retrieve the messages from the RAM unit 26 and to cause display of the messages on the associated LCD 34. By appropiate depression of the UP and DOWN buttons BB3 and BB4, he can scan the entire set of messages stored and determine whether to respond immediately or later. Once he has dealt with any currently displayed message, the individual can depress the CLEAR button BB2 which causes transmission to the central unit 10 of instructions to delete the currently displayed message from the RAM unit 26. This deletion operation may again be accompanied by a software routine which requests verification of the requested deletion and awaits an appropriate response, as by a second pressing of the CLEAR button BB2.

The central unit 10 may be adapted to permit correction of stored messages and also system parameters. By forming at the keyboard 16 the command required to initiate a system congifuration function, the operator may be prompted with options relating to date, time, names (individuals and remote units identified by the system) and messages. By selecting the messages option and entering the identification code or name of an individual, the operator can review all messages stored for a particular remote unit and edit the associated text.

With respect to the general operation of the central unit 10, it should be noted that during the composition of enquiry messages and records, and at each stage where data must be provided to the central unit 10, limited text editing in the form of a delete or backspace function is provided. Also, at each stage of operation, an exit key can be depressed at the keyboard 16 to return to a previous stage. However, once an enquiry message has been entered for transmission, correction can only be accomplished by forwarding another message. Similarly, with any function requiring deletion of data from the ram unit 26 a prompt is provided to verify whether deletion is required, but once deletion has finally been requested, there are no means for reversing the deletion.

The advantages of the call processing system should now be apparent. The operator can transmit an initial message regarding an incoming call and proceed immediately to answer further incoming calls or to process responses regarding existing calls. Since the responses from office staff are queued in the RAM unit 26, the operator is not pressed to deal with any particular response except as most convenient. Messages from the operator advising of an incoming call are discreetly received, without significant interruption of the individual addreded, and a response regarding handling of an incoming call can in most instances be effected by simple depression of a button thereby considerably reducing the time otherwise required to instruct the operator. In many instances it will be immediately apparent to the individual whether the call is urgent and whether he should interrupt a meeting or his work to respond. Each member of the office staff also has an immediate indication on his remote unit of any current telephone messages and can retrieve the messages in a timely fashion. Since no written message need be transmitted to any individual, there is little possibility of losing a message. Most significantly, the operator can handle a larger number of incoming calls thereby eliminating in many instances the need to provide a second operator and telephone equipment required to permit the second operator to intercept incoming calls.

It will be appreciated that a particular embodiment of the invention has been described for purpose of illustrating the principles inherent in invention and should not be regarded as necessarily restricting the scope of the invention or of the appended claims. For example, any appropriate means may be provided to permit bidirectional transmission of messages between the central unit and each remote unit, including a radio link or a combined telephone and radio link. The system accordingly lends itself to placing a remote unit in a vehicle for in association with a mobile telephone. In such circumstances, the remote unit might be adpated not only to retrieve records from a central unit located at the individual's office, but also to store the retrieved messages in a memory unit provided in the remote unit so that the individual can review such messages without further communication with the central unit. Such alternatives are regarded as coming within the ambit of the present invention.

Also, the telephone call processing system need not be a system distinct from the office telephone system with which it is used. The central unit can be built directly into a switchboard and each of the remote units can be built directly into a telephone which is connected to the switchboard thereby integrating the call processing system with an office telephone system. Such an arrangement should be regarded as falling within the ambit of the present invention and the scope of the appended claims.

I claim:

1. A system for processing telephone calls received by a telephone switchboard operator and intended for individuals at a plurality of telephones to which the switchboard can direct incoming calls, comprising:
   a central unit;
   a plurality of remote units;
   means for permitting bidirectional transmission of messages between the central unit and each of the remote units;
   the central unit having associated therewith
   a. central unit display means;
   b. input means for permitting the operator to compose enquiry messages regarding incoming telephone calls and to display the composed enquiry message on the central unit display means;
   c. means for permitting the operator to address and transmit the enquiry messages selectively to the remote units;
   d. means for automatically storing response messages transmitted from the remote units to the central unit;
   e. retrieval means for permitting the operator to retrieve and display the stored response messages;
   each remote unit having associated therewith
   a. remote unit display means;
   b. means for displaying on the remote unit display means enquiry messages transmitted to the remote unit from the central unit;
   c. response generating and transmitting means for permitting an individual at the remote unit to generate and trnasmit to the central unit a response message in response to any enquiry message received from the central unit.

2. A telephone call processing system as claimed in claim 1 in which:
   the input means permit the operator to compose and display on the central unit display means records regarding incoming telephone calls and to address the records to particular remote units;
   the system comprises storage means for storing the composed and addressed records;
   each of the remote units comprises record retrieval means for permitting an individual at the remote unit to retrieve and display on the remote unit display means each stored record addressed to the remote unit.

3. A telephone call processing system as claimed in claim 2 in which each of the remote units comprises means for permitting an individual at the remote unit to delete from the storage means any record which has been retrieved and displayed on the remote unit display means.

4. A telephone call processing system as claimed in claim 2 comprising electronic clock and calendar means for generating data identifying the current time and data, the central unit being adapted automtically to insert the current date and time into each stored record.

5. A telephone call processing system as claimed in claim 2 in which the storage means are normally powered with electric power delivered by a line source, the system comprising:
sensing means for sensing a failure of delivery of electric power from the line source;
back-up power supply means for supplying electric power to the storage means; and
means responsive to the sensing means for coupling the back-up power supply means to the storage means for delivery of electric power thereto in the event of a failure of deliver of electric power from the line source.

6. A telephone call processing system as claimed in claim 1 in which the response generating and transmitting means associated with each remote unit comprise:
a plurality of manually-operable switches;
means responsive to the operation of each switch for generating a predetermined response message dependent on the switch operated.

7. A telephone call processing system as claimed in claim 6 in which the response generating and transmitting means associated with each of the remote unit comprises means responsive to receipt of an enquiry message transmitted from the central unit for transmitting to the central unit a default response message in the event that none of the manually-operable switches is operated within a predetermined period of time.

8. A telephone call processing system as claimed in claim 1 in which the response generating and transmitting means associated with each remote unit comprise:
first, second and third manually-operable switches;
means for generating a first predetermined response message instructing that an incoming call should be passed through to the intended recipient of the incoming call, a second predetermined response message instructing that the incoming call should be placed on hold, and a third predetermined response message instructing that the incoming call should not be passed to the intended recipient in response to operation of the first, second and third switches, respectively; and
means responsive to receipt of an enquiry message transmitted from the central unit for transmitting to the central unit a default response message in the event that none of the manually-operable switches is operated within a predetermined period of time.

9. A telephone call processing system as claimed in claim 1 in which the input means include a keyboard, the keyboard comprising function keys and means associated with the function keys for causing the composition and display on the central unit display means of predetermined message segments.

10. A telephone call processing system as claimed in claim 1 in which:
the central unit comprises means for generating and transmitting to each of the remote units together with any enquiry message intended for the remote unit a sound command signal; and,
each of the remote units comprises means for producing an audible sound in response to a received sound command signal whereby the attention of an individual at the remote unit can be drawn to receipt of the transmitted enquiry message.

11. A telephone call processing system as claimed in claim 10 in which the central unit comprises means for permitting the operator to designate whether any particular one of the remote units is to receive a sound command signal and for suppressing transmission of the sound command signal in connection with the transmission of an enquiry message from the central unit to any remote unit which is not designated to receive a sound command signal.

12. A telephone call processing system as claimed in claim 1 in which the central unit comprises:
means for storing the names of individuals to be associated with each remote unit and an identifying code to be associated with each of the remote units;
means for displaying on the central unit display means in response to composition at the input means of any one of the identifying codes the name of the individual associated with the remote unit associated with the any one of the identifying codes.

13. A telephone call processing system as claimed in claim 1 in which each of the remote units comprises for generating a flashing light in response to the receipt of an enquiry message transmitted from the central unit.

14. A system for processing telephone calls received by a telephone switchboard operator and intended for individuals at a plurality of telephones to which the switchboard can direct incoming calls, comprising:
a central unit;
a plurality of remote units;
means for permitting bidirectional transmission of messages between the central unit and each of the remote units;
the central unit having associated therewith
 a. central unit display means;
 b. input means for permitting the operator to compose enquiry messages regarding incoming telephone calls and to display the composed enquiry messages on the central unit display means;
 c. means for permitting the operator to address and transmit the enquiry messages selectively to the remote units;
 d. recording means for automatically recording the transmitted enquiry messages and any response messages received by the central unit;
 e. retrieval means for permitting the operator to retrieve and so display on the central unit display means the recorded response and enquiry messages that the association between each response message and the associated enquiry message is visually apparent to the operator;
each remote unit having associated therewith
 a. remote unit display means;
 b. means for displaying on the remote unit display means enquiry messages transmitted to the remote unit from the central unit;
 c. response generating and transmitting means for permitting an individual at the remote unit to generate and transmit to the central unit a response message in response to any enquiry message received from the central unit.

15. A telephone call processing system as claimed in claim 14 in which:
the central unit comprises means for assigning to each enquiry message and transmitting therewith an enquiry identification code;
the response generating and transmitting means associated with each of the remote units are responsive to the enquiry identification code associated with any enquiry message received by the remote unit and transmit together with any response message generated by the remote unit a response identification code corresponding to the received enquiry message identification code.

16. A telephone call processing system as claimed in claim 15 in which the automatic recording means associated with the central unit records each transmitted enquiry message together with the associated enquiry identification code and records each response message received by the central unit together with the associated response identification code.

17. A telephone call processing system as claimed in claim 14 in which the retrieval means permit the operator to sequentially retrieve and display on the central unit display means the recorded response messages and permit the operator in response to a currently displayed one of the recorded response messages to retrieve and display the associated enquiry message.

18. A telephone call processing system as claimed in claim 14 in which the retrieval means permit the operator to retrieve and alternately display each recorded response message and the associated recorded enquiry message.

19. A telephone call processing system as claimed in claim 14 in which:
   the input means permit the operator to compose and display on the central unit display means records regarding incoming telephone calls and to address the records to particular remote units;
   the system comprises storage means for storing the composed and addressed records;
   each of the remote units comprises record retrieval means for permitting an individual at the remote unit to retrieve and display on the remote unit display means each stored record addressed to the remote unit.

20. A telephone call processing system as claimed in claim 19 in which each of the remote units comprises means for permitting an individual at the remote unit to delete from the storage means any record which has been retrieved and displayed on the remote unit display means.

21. A telephone call processing system as claimed in claim 20 in which the retrieval means associated with the central unit permit the operator to retrieve from the storage means and display on the central unit the records addressed to any particular one of the remote units.

22. A telephone call processing system as claimed in claim 14 in which the response generating and transmitting means associated with each remote unit comprise:
   a plurality of manually-operable switches;
   means responsive to the operation of each switch for generating a predetermined response message dependent on the switch operated.

23. A telephone call processing system as claimed in claim 22 in which the response generating and transmitting means associated with each of the remote unit comprises means responsive to receipt of an enquiry message transmitted from the central unit for transmitting to the central unit a default response message in the event that none of the manually-operable switches is operated within a predetermined period of time.

24. A telephone call processing system as claimed in claim 14 in which:
   the central unit comprises means for generating and transmitting to each of the remote units together with any enquiry message addressed to the remote unit a sound command signal; and,
   each of the remote units comprises means for producing an audible sound in response to a received sound command signal whereby the attention of an individual at the remote unit can be drawn to receipt of the transmitted enquiry message.

25. A telephone call processing system as claimed in claim 24 in which the central unit comprises means for permitting the operator to designate whether any particular one of the remote units is to receive a sound command signal and for suppressing transmission of the sound command signal in connection with the transmission of any enquiry message from the central unit to any remote unit which is not designated to receive a sound command signal.

* * * * *